(12) United States Patent
Garney

(10) Patent No.: US 7,389,398 B2
(45) Date of Patent: Jun. 17, 2008

(54) METHODS AND APPARATUS FOR DATA TRANSFER BETWEEN PARTITIONS IN A COMPUTER SYSTEM

(75) Inventor: John I. Garney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 243 days.

(21) Appl. No.: 11/300,609

(22) Filed: Dec. 14, 2005

(65) Prior Publication Data

US 2007/0136550 A1 Jun. 14, 2007

(51) Int. Cl.
*G06F 12/10* (2006.01)
(52) U.S. Cl. .................................... 711/173; 711/202
(58) Field of Classification Search ...................... None
See application file for complete search history.

(56) References Cited

U.S. PATENT DOCUMENTS 7,089,558 B2 * 8/2006 Baskey et al. .............. 718/104

2006/0259731 A1 * 11/2006 Oshins et al. ............... 711/173

* cited by examiner

*Primary Examiner*—Than Nguyen
(74) *Attorney, Agent, or Firm*—Buckley, Maschoff & Talwalkar LLC

(57) ABSTRACT

A method includes establishing two partitions, including a first partition and a second partition, in a computer system. The method further includes designating a first memory page in memory space controlled by the first partition, designating a second memory page in memory space controlled by the second partition, storing an address of the first memory page in an address mapping array that is accessible by the first partition and storing an address of the second memory page in an address mapping array that is accessible by the second partition. In addition, the method includes exchanging the address of the first memory page in the address mapping array that is accessible by the first partition with the address of the second memory page in the address mapping array that is accessible by the second partition.

18 Claims, 5 Drawing Sheets

METHODS AND APPARATUS FOR DATA TRANSFER BETWEEN PARTITIONS IN A COMPUTER SYSTEM

BACKGROUND

It is sometimes advantageous to divide a computer system into two or more "partitions" where each partition is a collection of system resources that can operate independently or quasi-independently from the other partition or partitions. For example, "soft" partitioning can be implemented by using software known as a "virtual machine monitor" to create two or more execution environments in a single computer. The computer may include only one microprocessor, in which case the various partitions may be implemented on a time-multiplexed basis. In addition, or alternatively, the computer may have more than one microprocessor, or one or more microprocessor may include two or more processing cores. Memory and/or input/output facilities may be shared by the partitions. One or more of the processors and/or cores may be shared.

In so-called "firm" partitioning there are two or more central processing units, each of which is dedicated to a respective partition. Typically in firm partitioning, all functional resources are separated into the respective partitions and are redundant. However there may be some resources such as buses or power planes that are shared and may produce common failure dependencies. Each partition may have its own portions of RAM (random access memory) within the same dual inline memory module.

Just as data exchange among networked computers is often desirable, so too would it be advantageous to have an efficient manner of exchanging data between partitions within a computer.

DETAILED DESCRIPTION

Figure 1:
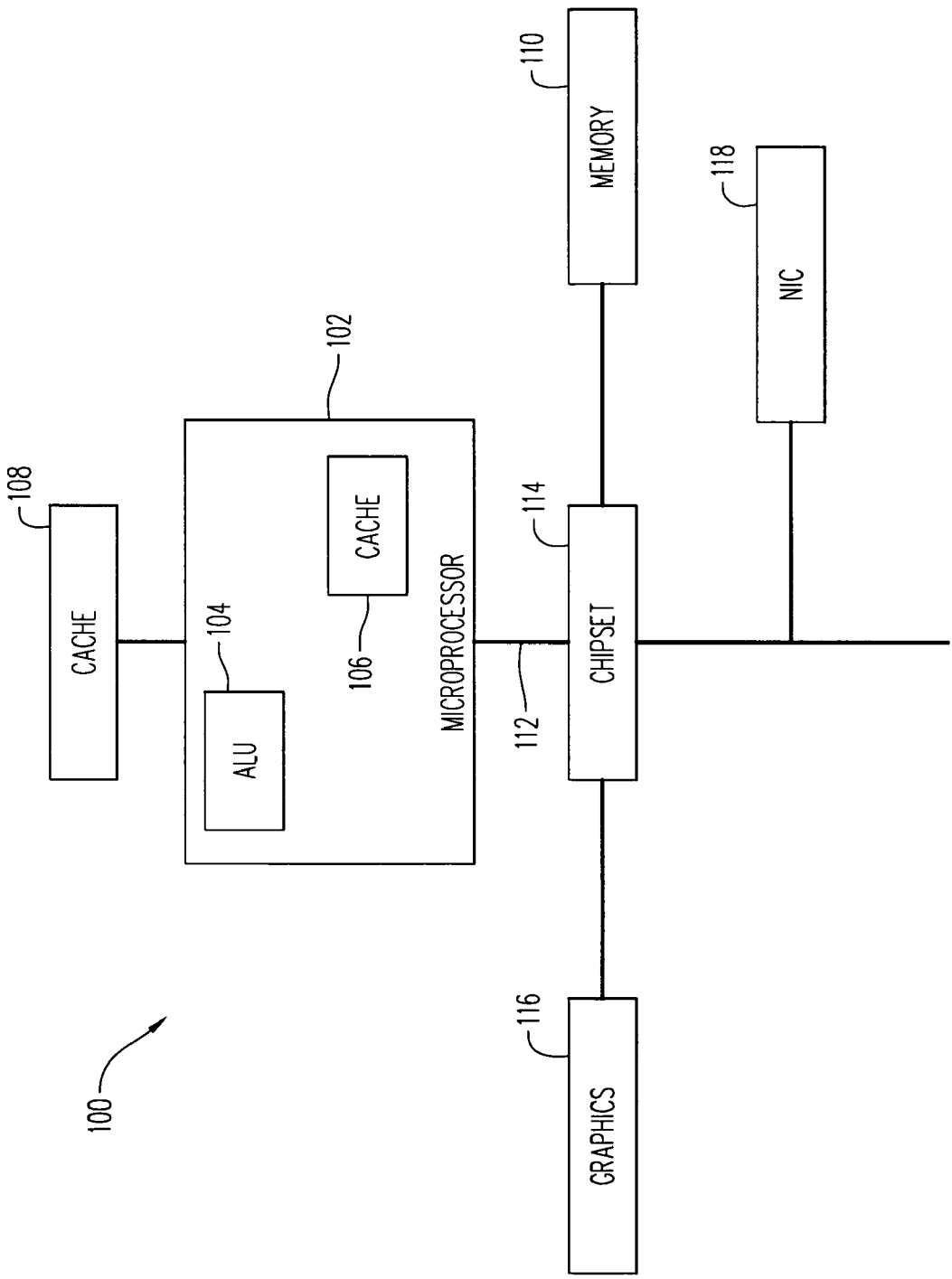
FIG. 1 is a block diagram of a computer system according to some embodiments.

FIG. 1 is a block diagram of a computer system 100 provided according to some embodiments. The computer system 100 includes a microprocessor die 102, which, in turn, comprises many sub-blocks. The sub-blocks may include arithmetic logic unit (ALU) 104 and on-die cache 106. Microprocessor 102 may also communicate to other levels of cache, such as off-die cache 108. Higher memory hierarchy levels, such as system memory 110, are accessed via host bus 112 and chipset 114 and are in communication with the microprocessor 102. In addition, other off-die functional units, such as graphics accelerator 116 and network interface controller (NIC) 118, to name just a few, may communicate with microprocessor 102 via appropriate buses or ports. The system 100 may also include a number of peripheral devices, which are not shown. Software instructions to control the microprocessor 102 to perform functionality described hereinafter may be stored in the memory 110.

Although not shown in the drawing, the computer system 100 may, in alternative embodiments, include two or more microprocessors, which may share the system memory 110, at least to the extent of utilizing respective memory devices (not separately shown) which may be housed in a single memory package (not separately shown). One or more of the microprocessor or microprocessors included in the computer system 100 may include two or more processing cores (not separately shown).

Figure 2:
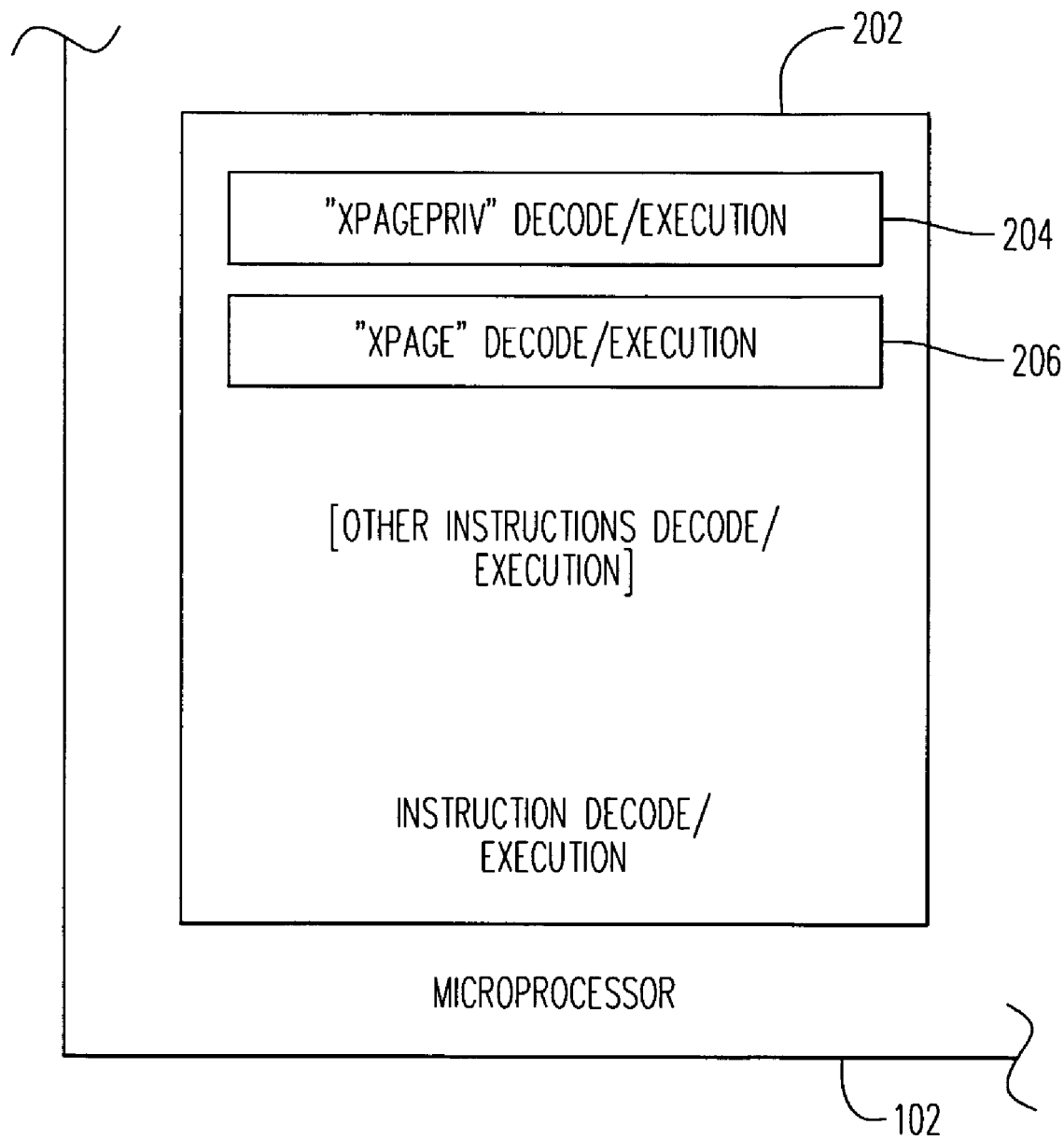
FIG. 2 schematically illustrates some aspects of a microprocessor that is part of the computer system of FIG. 1.

FIG. 2 schematically illustrates some aspects of microprocessor 102. The microprocessor 102 includes at least one processing core (not separately indicated) and may include two or more processing cores (not separately indicated). The processing core, in turn, includes microcircuitry 202 which is provided to decode and/or execute program instructions that are included in software that controls operation of the microprocessor 102. According to some embodiments, the instruction decode/execution microcircuitry 202 includes a first instruction execution circuit 204 which has the function of executing an instruction that may have the designation "xpagepriv". The "xpagepriv" instruction will be further described below. The instruction decode/execution microcircuitry 202 also includes a second instruction execution circuit 206 which has the function of executing an instruction that may have the designation "xpage". The "xpage" instruction will be further described below. To anticipate subsequent discussion, the "xpagepriv" and "xpage" instructions may be utilized to implement a technique for exchanging data between two or more partitions in the computer system 100, in accordance with aspects of some embodiments.

Each of the first instruction execution circuit 204 and the second instruction execution circuit 206 may be implemented by suitable processing logic and/or microcode in any combination thereof that is convenient. Although the first instruction execution circuit 204 and the second instruction execution circuit 206 are illustrated as separate circuits, in practice the same may overlap to some extent, and may share at least some processing logic and/or microcode.

Figure 3:
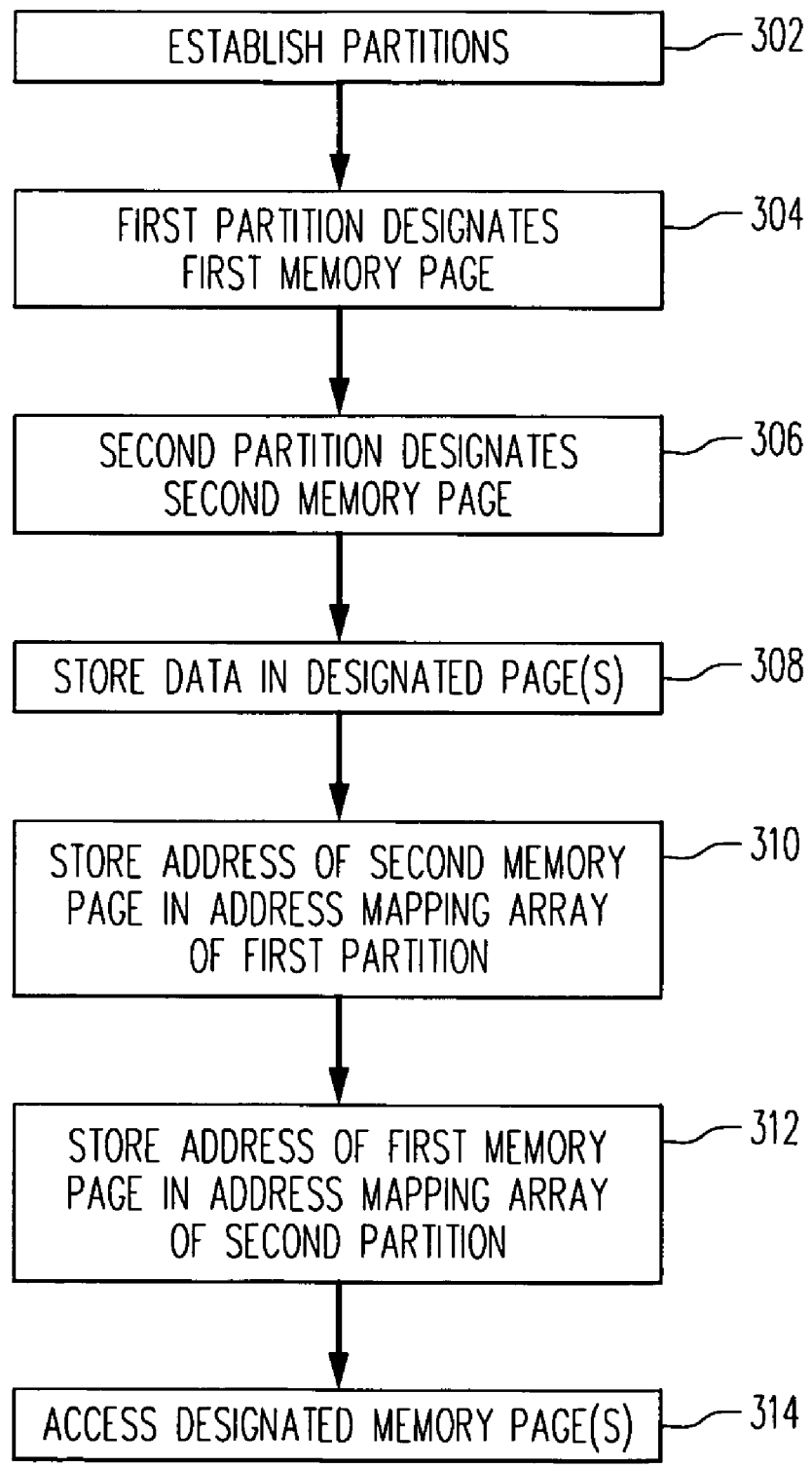
FIG. 3 is a flow chart that illustrates a process performed in the computer system of FIG. 1 in accordance with some embodiments.

FIG. 3 is a flow chart that illustrates a process performed in the computer system 100 in accordance with some embodiments.

At 302 in FIG. 3, two or more partitions are established in the computer system 100. As noted above, each partition may be a collection of resources of the computer system 100 that can operate independently or quasi-independently for other partitions. The partitions that are established at 302 may include a first partition that may be referred to as "partition A" and a second partition that may be referred to as "partition B". The partitioning may be "soft" or "firm" and may be implemented by suitable software such as a virtual machine monitor. The software which manages the partitioning of the computer system 100 may allocate resources (part or all of a CPU, memory, I/O devices, etc.) to each partition. The partition manager software may also establish a respective interpartition bridge (IPB) between each two partitions that are established. The IPB may include data that is utilized for implementing controlled communication between the two partitions to which the IPB pertains. It will be appreciated that each partition may include an independent operating system instance and may run one or more application programs to perform functions of the computer system 100.

At 304, partition A designates a particular memory page that is controlled by partition A for use in exchanging data with partition B. At 306, partition B designates a particular memory page that is controlled by partition B for use in exchanging data with partition A. At 308, partition A stores, in the page it designated at 304, data to be exchanged with partition B, and/or partition B stores, in the page it designated at 306, data to be exchanged with partition A.

At this point, the discussion of FIG. 3 will be interrupted for a description of conventional address translation. In conventional address translation, virtual addresses used by an application program are translated to system physical addresses. Typically this is done via page tables. When the microprocessor or processing core executes an instruction that has an address reference supplied as part of the instruction, this address reference is a virtual address (if paging address translation is enabled or active). The microprocessor or core takes the address and uses portions of the address to index into one or more page tables that allow the address to be translated into a physical address. These page tables are set up by the operating system, or possibly a virtual machine monitor, on behalf of the application. Different application processes may have different page tables. The microprocessor or core always performs the address translation for all virtual addresses encountered during instruction execution. In some microprocessors, there may be multiple "layers" of address translation, with all but the lowest (last) layer translating from one virtual address to another, lower level, virtual address.

As will be seen, in some embodiments described herein an additional address mapping mechanism is provided that applies to a final address translation from a virtual address to a physical address.

Now resuming the discussion of FIG. 3, at 310, an operation is performed in which the physical address of the memory page designated by partition B at 306 is stored in an address mapping array that is accessible by partition A. At 312, an operation is performed in which the physical address of the memory page designated by partition A at 304 is stored in an address mapping array that is accessible by partition B. At 314, partition B accesses the memory page designated at 304 by partition A. The accessing of this memory page by partition B is accomplished via the address mapping array that is accessible by partition B. In addition, or alternatively, at 314, partition A accesses the memory page designated at 306 by partition B. The accessing of this memory page by partition A is accomplished via the address mapping array that is accessible by partition A.

As a result of the process of FIG. 3, data is exchanged, in one or both directions, between partitions A and B.

The order of process stages set forth in FIG. 3 and described above is not intended to imply a fixed order of performing the process. Rather, the process stages may be performed in any order that is practicable. Moreover, at least some process stages may be combined and/or performed simultaneously.

Further details of the process of FIG. 3 will be described below with reference to FIGS. 4 and 5. First, however, there will now be described certain aspects of the above-mentioned IPBs (interpartition bridges) and of the establishment of the partitions.

The IPB which pertains to two of the partitions may include a data structure that is not directly addressable from either partition. The data structure (hereinafter referred to as an "IPB_info data structure") may contain state information that indicates what resources are allocated for use by the IPB. The data structure may be created at the same time as the partitions are created and resources are allocated to the partitions.

Each partition may have a private (i.e., not directly addressable) array (hereinafter referred to as the "IPB_list array" for the partition) that contains references to the IPB_info data structure that is part of the IPB between the partition in question and another partition. Each partition may identify a given IPB which pertains to the partition with a simple partition-local index. For example, partition A may identify the IPB shared with partition B as "IPBj" in the IPB_list array for partition A, whereas partition B may identify that IPB as "IPBk" in the IPB_list array for partition B. In some embodiments, each IPB may have a longer lifetime identifier to allow each partition that desires to use an IPB to recognize the IPB and to use the correct index in its local IPB_list array. This information may be discovered by the partitions and/or enumerated in a number of ways, such as with a type of ACPI (Advanced Configuration and Power Interface) entry.

Figure 4:
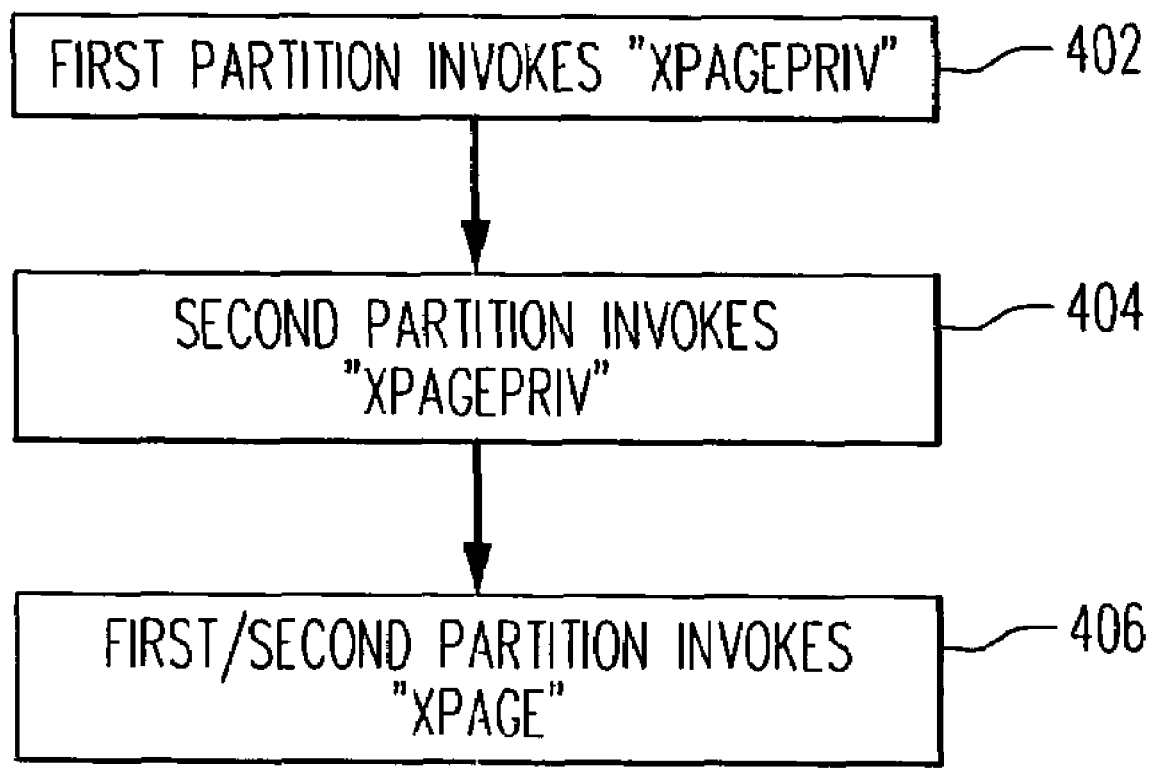
FIG. 4 is a flow chart that illustrates some details of the process of FIG. 3.

FIG. 4 is a flow chart that illustrates some details of the process of FIG. 3. In particular, the ensuing discussion of FIG. 4 will indicate how the above-mentioned "xpagepriv" and "xpage" instructions may be defined, and how they may be used as part of the process described above in connection with FIG. 3.

The "xpagepriv" instruction may be invoked by software in a partition when the partition needs to designate a memory page that it controls so that the memory page is used for exchanging data with another partition. The "xpagepriv" instruction takes as arguments the physical address of the memory page to be designated, the physical address of the page table entry for the page, the index (e.g., IPBj) which identifies the IPB between the invoking partition and the partition with which the data is to be exchanged, and a flag to indicate whether the current operation is for allocation or de-allocation of the page to the IPB in question. "xpagepriv" defined in this fashion would be a privileged instruction that typically would be invoked only by an operating system. "xpagepriv" could also be defined to take a virtual address of the memory page along with the IPB local index instead of a physical address for the page and the page table entry for the page. Within the implementation of such a defined instruction, the virtual address can be used to determine the corresponding physical addresses of the page and page table entry. Such a definition would allow typical application code to invoke such an instruction.

During execution of the "xpagepriv" instruction for purposes of allocating a memory page to an IPB, the memory page physical address and the page table entry physical address are stored in the IPB_info data structure for the IPB indicated by the IPB index. In addition, an entry (referred to, e.g., as "alias_A" in the case where partition A is invoking the instruction) is allocated in a partition local address mapping array (referred to hereinafter as the "alias_map" array, and not directly accessible by software executing in the partition). Further, the value stored at the page table entry physical address is set to the allocated entry address in the alias_map array, and the value stored at the allocated entry address is set to the physical address of the designated memory page (i.e., the page being allocated to the IPB). Execution of the "xpagepriv" instruction creates an indirect reference from the page table entry to the designated memory page via the allocated entry in the alias_map array.

As will be seen, the "xpage" instruction may be invoked after suitable set-up has been performed with instances of the "xpagepriv" instruction. The "xpage" instruction takes as arguments the index (e.g., IPBj) that indicates the IPB between the invoking partition and the partition with which information is to be exchanged, and the virtual address of the memory page that has been allocated by the invoking partition to the IPB.

During the execution of the "xpage" instruction, a conventional walk through the page table of the invoking partition results in retrieval of the address of the allocated entry in the alias_map array for the invoking partition. Further, it is determined that this address falls in the alias_map array and the offset in the alias_map array is determined. From that entry in the alias_map array, the physical address for the designated memory page is retrieved. From the IPB_info data structure for the IPB in question, the address of the memory page allocated to the IPB by the other partition is determined, along with the address of the allocated alias_map entry for the other partition. Execution of the "xpage" instruction then proceeds to exchange the memory page addresses stored in the allocated alias_map entries of the two partitions. As a result, the address translation from one partition references the memory page designated by the other partition, and vice versa. Any entry in a cache or translation lookaside buffer (TLB) that is implicated by the swap of memory page addresses may also be updated or evicted by execution of the "xpage" instruction.

Referring now specifically to FIG. 4, at 402 it is indicated that partition A invokes a first instance of the "xpagepriv" instruction. In particular the operating system or virtual machine monitor which controls the memory page to be designated, or a device driver acting on behalf of the OS or VMM, may invoke the "xpagepriv" instruction for partition A. This instance of the "xpagepriv" instruction takes as its arguments the physical address of the memory page now being designated (allocated to the IPB) by partition A, the physical address of the page table entry for that memory page, the IPB index which indicates from the point of view of partition A the IPB between partition A and the partition (assumed in this case to be partition B) with which data is to be exchanged, and a flag value that indicates that allocation is to be performed by this instance of the instruction. Execution of this instance of the instruction may implement designation of a memory page (304 in FIG. 3) by partition A.

At 404 partition B invokes another instance of the "xpagepriv" instruction to designate (306 in FIG. 3), to the IPB with partition A, a memory page controlled by partition B. The latter instance of the "xpagepriv" instruction takes as its arguments the physical address of the memory page allocated to the IPB by partition B, the physical address of the page table entry for that memory page, the IPB index which indicates from the point of view of partition B the IPB between partitions A and B, and the value of the flag to indicate that allocation is to be performed by this instance of the instruction.

With these two instances of "xpagepriv" having been performed by the partitions A and B with respect to the IPB between the two partitions, the respective memory pages designated by the two partitions for the IPB in question are effectively paired with each other in the IPB_info data structure for the IPB between the two partitions. The paired pages may now be exchanged, by either one of the two partitions invoking an instance of the "xpage" instruction (as indicated at 406) with respect to the IPB between the two partitions. (In some embodiments, only one of the partitions needs to invoke "xpage" once the preparatory "xpagepriv" instances have been invoked. In other embodiments, both partitions may be required to invoke "xpage".) The execution of the "xpage" instruction has the effect of storing the address of the memory page designated by partition A in the alias_map array (at alias_A) for partition B (312 in FIG. 3) and storing the address of the memory page designated by partition B in the alias_map array (at alias_B) for partition A (310 in FIG. 3).

The order of process stages set forth in FIG. 4 and described above is not intended to imply a fixed order of performing the process. Rather, the process stages may be performed in any order that is practicable.

One or more suitable notification/event mechanisms may exist between the two partitions to coordinate when a page exchange is needed between the partitions and to indicate when the page designation and swapping has been accomplished. There may also be suitable mechanisms for loading the data to be exchanged in the pages that are designated or to be designated. Completion of data exchange may also be signaled between the two partitions in a suitable manner.

Figure 5:
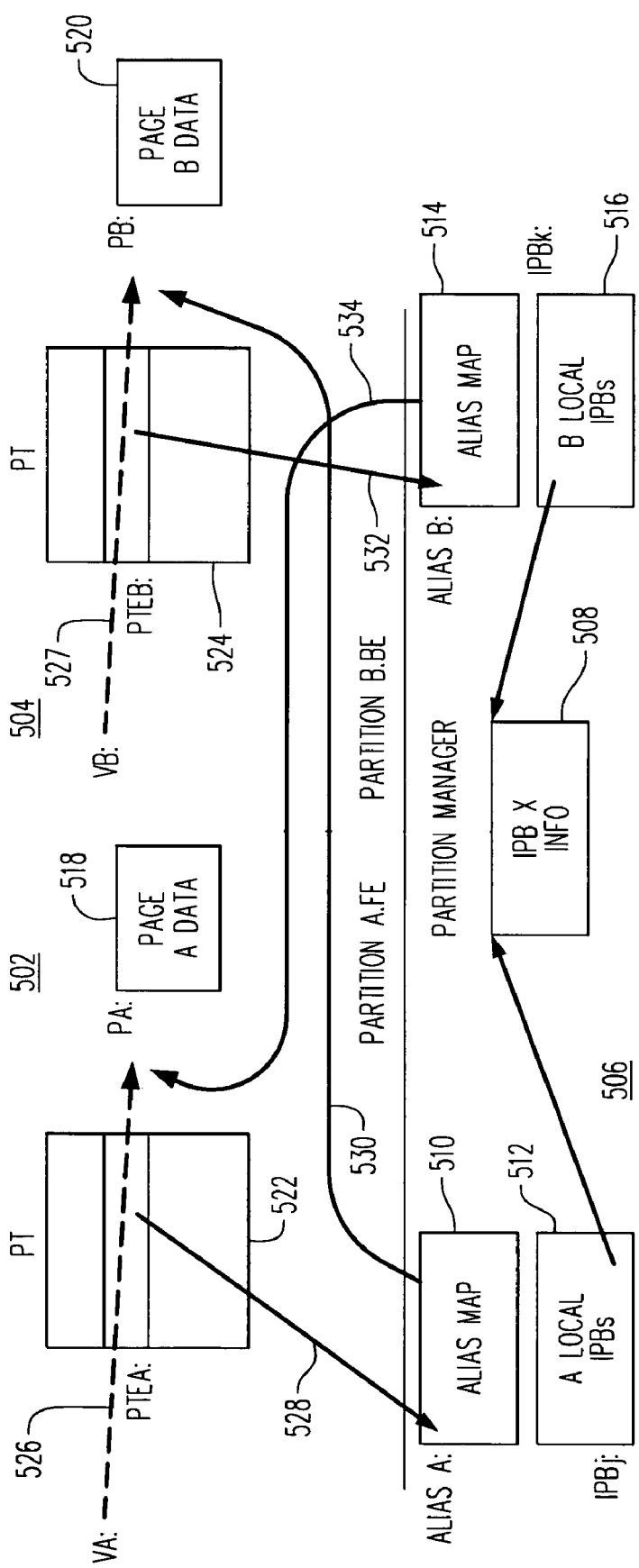
FIG. 5 schematically illustrates aspects of operation of the process of FIGS. 3 and 4.

FIG. 5 schematically illustrates aspects of operation of the process of FIGS. 3 and 4.

The upper left portion (indicated at 502) of the drawing represents partition A, or at least some portions thereof. The upper right portion (indicated at 504) represents partition B, or at least some portions thereof. The lower portion (indicated at 506) represents partition manager software that creates partitions, and some resources managed by the partition manager software 506. Indicated at 508 is the IPB_info data structure for the IPB between partitions A and B. The alias_map array for partition A is shown at 510. The references for partition A to the one or more IPBs that pertain to partition A (only one IPB is indicated) are represented at 512. The alias_map array for partition B is shown at 514. The references for partition B to the one or more IPBs that pertain to partition B (only one IPB is indicated) are represented at 516.

Reference numeral 518 represents the memory page designated or to be designated by partition A for use in data exchange with partition B. Reference numeral 520 represents the memory page designated or to be designated by partition B for use in data exchange with partition A. The page table for partition A is represented at 522 in FIG. 5 and the page table for partition B is represented at 524 in FIG. 5.

At a time when the memory page 518 has not been allocated by partition A 502 to an IPB, then use of the virtual address VA for the memory page 518 by partition 502 results in access (dashed arrow 526) to memory page 518 by partition 502 via a page table entry PTEA in page table 522. At a time when the memory page 520 has not been allocated by partition B 504 to an IPB, then use of the virtual address VB for the memory page 520 by partition 504 results in access (dashed arrow 527) to memory page 520 by partition 504 via a page table entry PTEB in page table 524.

Alternatively, when the pages 518 and 520 have been allocated to the IPB between the two partitions and the pages 518, 520 have been swapped: (A) Use of the virtual address VA by partition 502 leads via page table entry PTEA of page table 522 to allocated entry "alias_A" (arrow 528) in alias_map array 510, and by indirection from alias_A to page 520 (arrow 530); and (B) use of the virtual address VB by partition 504 leads via page table entry PTEB of page table 524 to allocated entry "alias_B" (arrow 532) in alias_map array 514, and by indirection from alias_B to page 518 (arrow 534).

The address translation described herein for data exchange between partitions coexists with (a) an application view of virtual addresses that has no visibility of "xpage" and "xpagepriv", and (b) operating system control of conventional page table address translation, but the operating system has no visibility of "xpage" address mapping, although it has knowledge via "xpagepriv" that the mappings are being modified. Further, "xpagepriv" and "xpage" have a view of their own address mapping, with modification of operating system page tables.

Advantages of the data exchange techniques described herein may include the following, among others:

Queuing space and data copying may not be required.
No global shared range of addresses may be needed.
Two 4K pages may be exchanged with each execution of the "xpage" instruction.
Complex fine-grained access controls may not be required.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
establishing two partitions, including a first partition and a second partition, in a computer system;
designating a first memory page in memory space controlled by the first partition;
designating a second memory page in memory space controlled by the second partition;
storing an address of the first memory page in an address mapping array that is accessible by the first partition;
storing an address of the second memory page in an address mapping array that is accessible by the second partition; and
exchanging the address of the first memory page in the address mapping array that is accessible by the first partition with the address of the second memory page in the address mapping array that is accessible by the second partition;
wherein:
the designating the first memory page includes executing a first instance of a first instruction, said first instance of said first instruction taking at least one argument, the at least one argument including a physical address of the first memory page; and
the at least one argument includes an index that indicates a interpartition bridge between the first and the second partitions.

2. The method of claim 1, wherein the at least one argument includes a flag to indicate allocation of the first memory page to the interpartition bridge.

3. The method of claim 1, wherein executing the first instance of the first instruction includes storing the physical address of the first memory page and the physical address of a page table entry for the first memory page in a data structure for the interpartition bridge.

4. The method of claim 3, wherein the exchanging the address of the first memory page with the address of the second memory page includes executing a second instruction, said second instruction taking at least one argument, the at least one argument including an index that indicates an interpartition bridge between the first and second partitions.

5. The method of claim 1, wherein the at least one argument includes a physical address of a page table entry for the first memory page.

6. A computer system comprising:
at least one processor; and
at least one memory device in communication with the at least one processor and storing instructions to cause the at least one processor to:
establish two partitions, including a first partition and a second partition, in the computer system;
designate a first memory page in memory space controlled by the first partition;
designate a second memory page in memory space controlled by the second partition;
store an address of the first memory page in an address mapping array that is accessible by the first partition;
store an address of the second memory page in an address mapping array that is accessible by the second partition; and
exchange the address of the first memory page in the address mapping array that is accessible by the first partition with the address of the second memory page in the address mapping array that is accessible by the second partition;
wherein:
designating the first memory page includes executing a first instance of a first instruction, said first instance of said first instruction taking at least one argument, the at least one argument including a physical address of the first memory page; and
the at least one argument includes an index that indicates a interpartition bridge between the first and second partitions.

7. The computer system of claim 6, wherein the at least one argument includes a flag to indicate allocation of the first memory page to the interpartition bridge.

8. The computer system of claim 6, wherein executing the first instance of the first instruction includes storing the physical address of the first memory page and the physical address of a page table entry for the first memory page in a data structure for the interpartition bridge.

9. The computer system of claim 8, wherein the exchanging the address of the first memory page with the address of the second memory page includes executing a second instruction, said second instruction taking at least one argument, the at least one argument including an index that indicates an interpartition bridge between the first and second partitions.

10. The computer system of claim 6, wherein the at least one argument includes a physical address of a page table entry for the first memory page.

11. A microprocessor comprising:
a first instruction execution circuit to execute a first instruction to allocate, to an interpartition bridge between a first partition and a second partition, a first memory page in memory space controlled by the first partition; and
a second instruction execution circuit to execute a second instruction to exchange an address of the first memory page with an address of a second memory page that has been allocated to the interpartition bridge from memory space controlled by the second partition;
wherein:
the first instruction takes as arguments (a) a physical address of the first memory page, (b) a physical address of a page table entry for the first memory page, (c) an index that indicates the interpartition bridge, and (d) a flag to indicate allocation or deallocation of the first memory page.

12. The microprocessor of claim 11, wherein execution of the first instruction includes storing the physical address of the first memory page and the physical address of the page table entry for the first memory page in a data structure for the interpartition bridge.

13. The microprocessor of claim 12, wherein execution of the first instruction further includes storing the physical address of the first memory page in the address mapping array that is accessible by the first partition.

14. The microprocessor of claim 13, wherein:
the second instruction takes as arguments (a) the index that indicates the interpartition bridge, and (b) a virtual address of the first memory page.

15. The microprocessor of claim 14, wherein execution of the second instruction includes transferring the physical address of the second memory page to the address mapping array that is accessible by the first partition from an address mapping array that is accessible by the second partition.

16. The microprocessor of claim 15, wherein execution of the second instruction includes transferring a physical address of the first memory page to the address mapping array that is accessible by the second partition from the address mapping array that is accessible by the first partition.

17. A system comprising:
a die comprising a microprocessor; and
a chipset in communication with the microprocessor;
wherein the microprocessor comprises:
a first instruction execution circuit to execute a first instruction to allocate, to an interpartition bridge between a first partition and a second partition, a first memory page in memory space controlled by the first partition; and
a second instruction execution circuit to execute a second instruction to exchange an address of the first memory page with an address of a second memory page that has been allocated to the interpartition bridge from memory space controlled by the second partition;
wherein:
the first instruction takes as arguments (a) a physical address of the first memory page, (b) a physical address of a page table entry for the first memory page, (c) an index that indicates the interpartition bridge, and (d) a flag to indicate allocation or deallocation of the first memory page.

18. The system of claim 17, wherein execution of the first instruction includes storing the physical address of the first memory page and the physical address of the page table entry for the first memory page in a data structure for the interpartition bridge.

* * * * *